(12) United States Patent
Meijers et al.

(10) Patent No.: US 7,643,106 B2
(45) Date of Patent: Jan. 5, 2010

(54) DISPLAY MODULE

(75) Inventors: Jan Meijers, Heerlen (NL); Tjarco Boelkens, Heerlne (NL); Michel van Wordragen, Heerlen (NL)

(73) Assignee: TPO Hong Kong Holding Limited, Shatin (HK)

( * ) Notice: Subject to any disclaimer, the term of this patent is extended or adjusted under 35 U.S.C. 154(b) by 428 days.

(21) Appl. No.: 11/638,532

(22) Filed: Dec. 14, 2006

(65) Prior Publication Data

US 2007/0139583 A1 Jun. 21, 2007

(30) Foreign Application Priority Data

Dec. 15, 2005 (EP) .................................. 05112184

(51) Int. Cl.
*G02F 1/1335* (2006.01)
(52) U.S. Cl. .......................................... 349/64; 349/62
(58) Field of Classification Search ............... 349/61–65
See application file for complete search history.

(56) References Cited

U.S. PATENT DOCUMENTS 7,015,986 B2 * 3/2006 Brandt et al. .................. 349/58

* cited by examiner

*Primary Examiner*—Dung T. Nguyen
(74) *Attorney, Agent, or Firm*—Birch, Stewart, Kolasch & Birch, LLP

(57) ABSTRACT

A display module (100) comprises an LCD panel (110), which comprises a front substrate (114) and a rear substrate (116) opposed to the front substrate (114), a liquid crystal material sealed between the front substrate (114) and the rear substrate (116), a front polarizer (112) associated with the front substrate (114) and a rear polarizer (118) associated with the rear substrate (116). The components of the LCD panel are bonded together. The display module (100) further comprises a lightguide (130) having a first surface (131) facing the rear polarizer (118) and a second surface (132) opposed to the first surface (131). At least a part of the first surface (131) of the lightguide (130) is bonded directly to the rear substrate (116) of the LCD panel (110).

10 Claims, 2 Drawing Sheets

DISPLAY MODULE

BACKGROUND OF THE INVENTION

1. Field of Invention

This invention relates to a display module. This invention further relates to a portable electronic device, for example a mobile phone, a PDA etc., comprising such a display module.

2. Related Art

Typically, display modules comprise a liquid crystal display (LCD), which further comprises two substrates with respective sheets of polarizing films on each of the substrates and a liquid crystal material between the two substrates. On one of the substrates, the LCD further comprises a common electrode plane of indium-tin oxide covering the entire area of the LCD. The other substrate is provided with individual electrodes for each pixel of the display. The display module further comprises light enhancement sheets and diffuser sheets, a lightguide, a reflector sheet, which are housed together with the LCD into a housing unit. Generally, a separate black sticker is placed below a driver IC, which is placed on the lower substrates, to block light coming from the backlight. These types of displays are well known in the art and have been improved over time.

An embodiment of an LCD supporting structure is disclosed in U.S. Pat. No. -20030071941-A1. The LCD comprises a front substrate and a rear substrate, the rear substrate having an edge extending beyond the front substrate, this extended part of the rear substrate forming a non-overlapping region between the front substrate and the rear substrate. A liquid crystal material is present between the overlapping region of the front substrate and the rear substrate. The rear polarizer of the LCD module is fixed to a lightguide plate of a back lighting module using a double-sided adhesive tape (DSA). The DSA is made of black polyethylene terephtalate (PET) or the likes having light blocking properties. Adhesive layers formed on both surfaces of the black PET. A driver IC is positioned on the extended part of the rear substrate. A connecting foil is electrically connected to the IC driver which drivers the driver IC.

A disadvantage with the LCD module described above is that the LCD module is vulnerable to mechanical stress, for example during a fall or the stress created due to the back bending of the foil connected to the driver IC. This mechanical stress leads to cracking or breaking of the rear substrate thereby making the liquid crystal material flow out which is poisonous and harmful to the user. Additionally, the connecting foil, which is bent backwards, generates an uplifting force potentially separating the components of the LCD module, for example peeling off the rear polarizer from the rear substrate. This latter problem may be overcome by providing the LCD module with an upper bezel, however this has the disadvantage of increasing the thickness of the display module.

SUMMARY OF THE INVENTION

It is an object of the present invention to improve the mechanical robustness of a display module.

It is a further object of the invention to provide a portable electronic device such as a mobile phone, a PDA, a pocket personal computer and the likes with such a display module.

According to the first aspect thereof, the present invention provides a display module comprising an LCD panel, which comprises a front substrate and a rear substrate opposed to the front substrate, a liquid crystal material sealed between the front substrate and the rear substrates, a rear polarizer associated with the rear substrate, and the display module further comprising a lightguide having a first surface facing the rear polarizer and a second surface opposed to the first surface, and at least a part of the first surface of the lightguide being bonded directly to the rear substrate of the LCD panel.

A display module provides a direct bonding between the rear substrate of the LCD panel and the lightguide. This makes the adhesion stronger and thus provides greater stability. Additionally, the direct bonding between the rear substrate of the LCD panel and the lightguide avoids peel off of the rear polarizer, as the bonding need no longer be made via the rear polarizer.

The overall thickness of the display module remains limited because no upper bezel is required for holding the LCD module components together. This offers the additional advantage of reduced cost of producing such display modules.

In a preferred embodiment, the rear substrate has an extended part extending beyond the front substrate, and the lightguide is bonded directly said extended part of the rear substrate.

An advantage of an extended part of the rear substrate is that the driver IC can be mounted thereon. Further, a foil of conductive tracks is electrically connected to the driver. The driver and the foil are connected to a first surface of the extended part of the rear substrate. A second surface of the extended part of the rear substrate is directly bonded to the first surface of the lightguide. In this embodiment any heat produced by the driver IC located on the extended part of the rear substrate will not affect the rear polarizers bonding to the substrate.

In a further embodiment the lightguide is bonded directly to the rear substrate of the LCD panel circumferentially around the rear polarizer. An advantage thereof is the reduction in manufacturing costs as the rear polarizer is now chosen to be smaller in dimension, for example in terms of the length and breadth of the rear polarizer, than the front polarizer, such that the rear polarizer covers only the active region and not the entire rear substrate.

In a preferred embodiment the bonding between the lightguide and the rear substrate is via a double-sided adhesive foil.

An advantage of the double-sided adhesive foil with a bonding material on both sides, for example glue or adhesive or the like, is that the foil provides better mechanical strength to the connection between the rear substrate and the lightguide to overcome the uplifting forces.

In a further embodiment the double-sided adhesive foil has a thickness greater than a combination of the rear polarizer and a rear optical stack. The rear optical stack is provided on top of the rear polarizer and generally comprises brightness enhancements and/or diffuser films.

The thickness of the double-sided adhesive foil bonding the rear substrate of the LCD panel and the lightguide is arranged to accommodate the rear polarizer, brightness enhancement films and a diffuser film within the gap created by the circumferentially arranged double-sided adhesive film.

The thickness also allows for a gap between the rear polarizer and the stack, formed by the brightness enhancements films and the diffuser film, providing for cushioning to absorb shocks, for example, when an electronic device including the display module is dropped.

An advantage is that the thickness of the double-sided adhesive foil creates some empty space which avoids stress on the intermediate layers and the lightguide, formed by the brightness enhancements films and the diffuser films, for example when an electronic device with such a display module is dropped by absorbing the shocks.

In yet a further embodiment the double-sided adhesive foil is a laminate of a first foil having a light-reflecting surface facing the lightguide and a second foil having a light-absorbing surface facing the rear substrate.

The foil, for example, can be a white or light-reflective foil and a black or light-absorbing foil, the foils having different optical properties. For example, the white foil faces the lightguide thereby reflecting the light into the lightguide. An advantage of the black foil is that the black foil is a light shield that removes the need for using a back tape for light shielding thereby reducing cost of the display module.

In a further embodiment a portable electronic device, such as a mobile phone, a PDA, a pocket personal computer, a laptop etc., comprises such a display module.

BRIEF DESCRIPTION OF THE DRAWINGS

Aspects of the present inventions will become apparent from and will be elucidated with respect to the embodiments described hereinafter with reference to the accompanying drawings. The drawings illustrate the embodiments of the invention and together with the description, serve to explain the principles of the invention. In the drawings.

DETAILED DESCRIPTION OF THE INVENTION

The present invention will be apparent from the following detailed description, which proceeds with reference to the accompanying drawings, wherein the same references relate to the same elements. In the figures, similar reference signs reference components with the same function.

Figure 1:
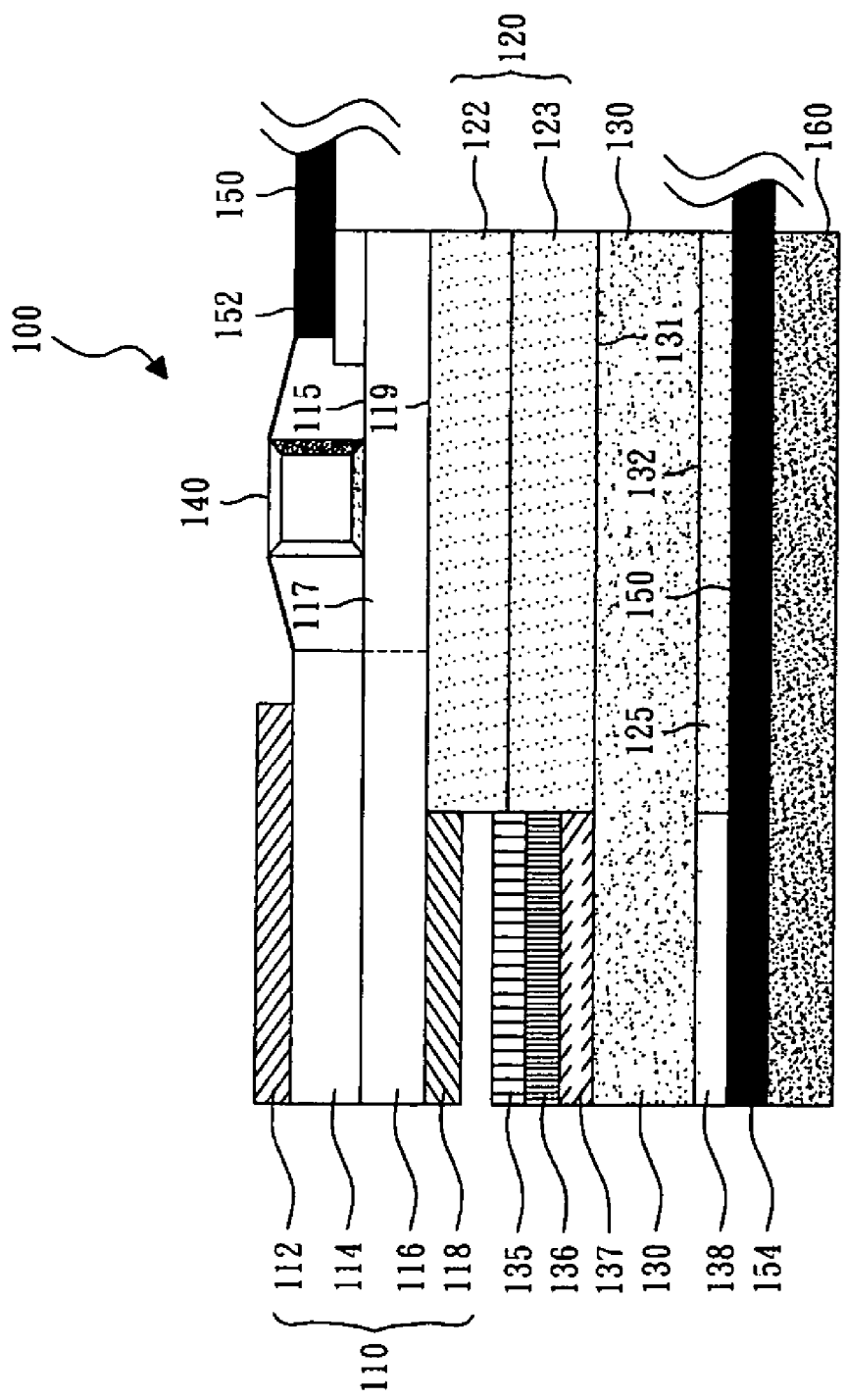
FIG. 1 shows a schematic representation of the display module in accordance with the present invention.

FIG. 1 shows a schematic representation of a display module 100 in accordance with the present invention. The LCD panel 110 comprises a front substrate 114 and a rear substrate 116, the rear substrate 116 opposing to the front substrate 114. The rear substrate 116 has an extended part 117 extending beyond the front substrate 116. A liquid crystal material is sealed between the overlapping regions of the front substrate 114 and the rear substrate 116. The overlapping regions cover the display area, and are generally much larger than the extended part 117, which is only a circumferential position around the display area. The rear substrate 116 has a first surface 115 facing the front substrate 114 and a second surface 119 facing a first surface 131 of a lightguide 130.

A front polarizer 112 is associated with the front substrate 114 and a rear polarizer 118 is associated with a part of the overlapping region of the rear substrate 116. The rear polarizer 118 is chosen to be smaller, for example the length and breadth of the rear polarizer is smaller than the front polarizer 112, such that the rear polarizer 118 only covers the active region of the LCD panel 110. However, the skilled person also recognizes that the second polarizer 118 may cover the complete overlapping region of the rear substrate 116 with the front substrate 114 or even cover nearly the complete rear substrate 116, including the overlapping region and the extended region 117, as described in US-20030071941, herein included by reference, but having at least a part of the rear substrate 116 bonded directly to the lightguide 130 via the double-sided adhesive foil 120.

In the present invention, the rear polarizer 118 can be chosen to be smaller than the front polarizer 112, for example the length and breadth of the rear polarizer 118 is chosen to be smaller than that of the front polarizer 112, and is further chosen such that the rear polarizer covers only the active region of the display module 100. The various components of the LCD panel 110, for example the front substrate 114 and rear substrate 116 and the front polarizer 112 and rear polarizer 118, are bonded together by means of a bonding agent, for example by adhesives or glues.

A driver IC 140 is mounted on the first surface 115 of the extended part 117 of the rear substrate 116 and is electrically connected to a foil 150 provided with conductive tracks. The driver IC 140 along with the foil 150 is arranged to drive the LCD panel 110.

The lightguide 130 has a first surface 131 facing the rear polarizer 116 and a second surface 132 opposite to the first surface 131. The lightguide 130 is provided with LEDs, not shown in the figure, which provide light to illuminate the LCD panel 110. Preferably, the foil 150 is attached to the driver IC 140 on the extended part 117 of the rear substrate 116 and arranged to feed the driver IC 140 with a driving signal. The foil 150 is bended back onto the rear of the display module 100 to make contact with a PCB, not shown in the figure, positioned on the lower side of the housing 160.

This back bending of the foil 150 creates an uplifting force, for example on the extended part 117 of the rear substrate where the foil 150 is connected to the driver IC 140, causing the components of the LCD panel 110 to be disintegrated. The present invention overcomes this problem because of the direct bonding between the rear substrate 116 of the LCD panel 110 and the lightguide 130, which provides a strong bonding overcoming the stress created due to the uplifting force, thereby preventing disintegration of the components of the LCD panel 110.

The display module 100 as described above forms a direct contact between the rear substrate 116, which is preferably a glass or a polymer material, and a first surface 131 of the lightguide 130, the lightguide preferably being made of glass or a polymer material. The direct contact between the rear substrate 116 of the LCD panel 110 and the lightguide 130 is made via the double-sided adhesive foil 120, for example a foil with glue or an adhesive or the like on both sides of the foil. An advantage of the double-sided adhesive foil 120 is that the foil provides a much stronger mechanical support to the contact between the rear substrate 116 of the LCD panel 110 and the lightguide 130.

The double-sided adhesive foil 120 directly connects at least a part of the first surface 131 of the lightguide 130 and the rear substrate 116 of the LCD panel 110. In a preferred embodiment, the double-sided adhesive foil 120 is arranged to circumferentially surround the rear polarizer 118, and directly connect the first surface 131 of the lightguide 130 with the rear substrate 116 of the LCD panel 110. The double-sided adhesive foil 120 comprises a laminate of an opaque foil 122 and a reflective foil 123. The opaque foil 122 of the double-sided adhesive foil 120 has light-absorbing surface facing the rear substrate 116. The opaque foil 122 acts as a light shield that shields the light from affecting the driver IC 140 mounted on the extended part 117 of the rear substrate 116. The reflective foil 123 reflects light back into the lightguide 130. The two laminated foils 122, 123 form the double-sided adhesive foil 120, which is provided 30 with glue or adhesives or the likes on its outer side making the direct bonding between the first surface 131 of the lightguide 130 and the rear substrate 116 of the LCD panel 110. Preferably the double-sided adhesive foil 120 has a thickness ranging from 0.25 mm to 0.7 mm. This thickness of the double-sided adhesive foil 120 has a further advantage in that components including the rear polarizer 118, and a rear optical stack including brightness enhancement films (BEFS) 135, 136 and a diffuser 137 are packed in-between the rear substrate 116 and the lightguide 130, still leaving a gap between the rear optical stack 135, 136, 137 and the rear polarizer 118. The gap provides for cushioning the components of the rear optical stack, for example during a fall, by absorbing shocks. The added thickness of the rear polarizers 118, the brightness enhancements films 135, 136 and diffuser films 137 are preferably in the range of about 0.025 mm to about 0.5 mm, with a thickness in the range of about 0.075 mm to 0.175 mm being preferred. Therefore, the thickness of the double-sided adhesive foil 120 is chosen such that it can accommodate the rear polarizer 118, the brightness enhancement films 135, 136 and the diffuser film 137.

A first end 152 of the foil 150 is electrically connected to the driver IC 140 that is mounted on the rear substrate 116. The second end 154 of the foil of conductive track is electrically connected to a printed circuit board mounted, not shown in the figure, on the metal bezel 160 of the display module 100 via a second DSA 125. A reflector 138 is provided in the gap created by the second DSA 125 between the lightguide 130 and the printed circuit board housed on the metal bezel 160. The reflector 138 is arranged to reflect light exiting in a direction away from the display panel back into the lightguide 130 thereby reducing the loss of light.

Such a display module 100 for example can be advantageously used in portable electronic devices such as mobile phones, PDAs, pocket personal computers etc.

Figure 2:
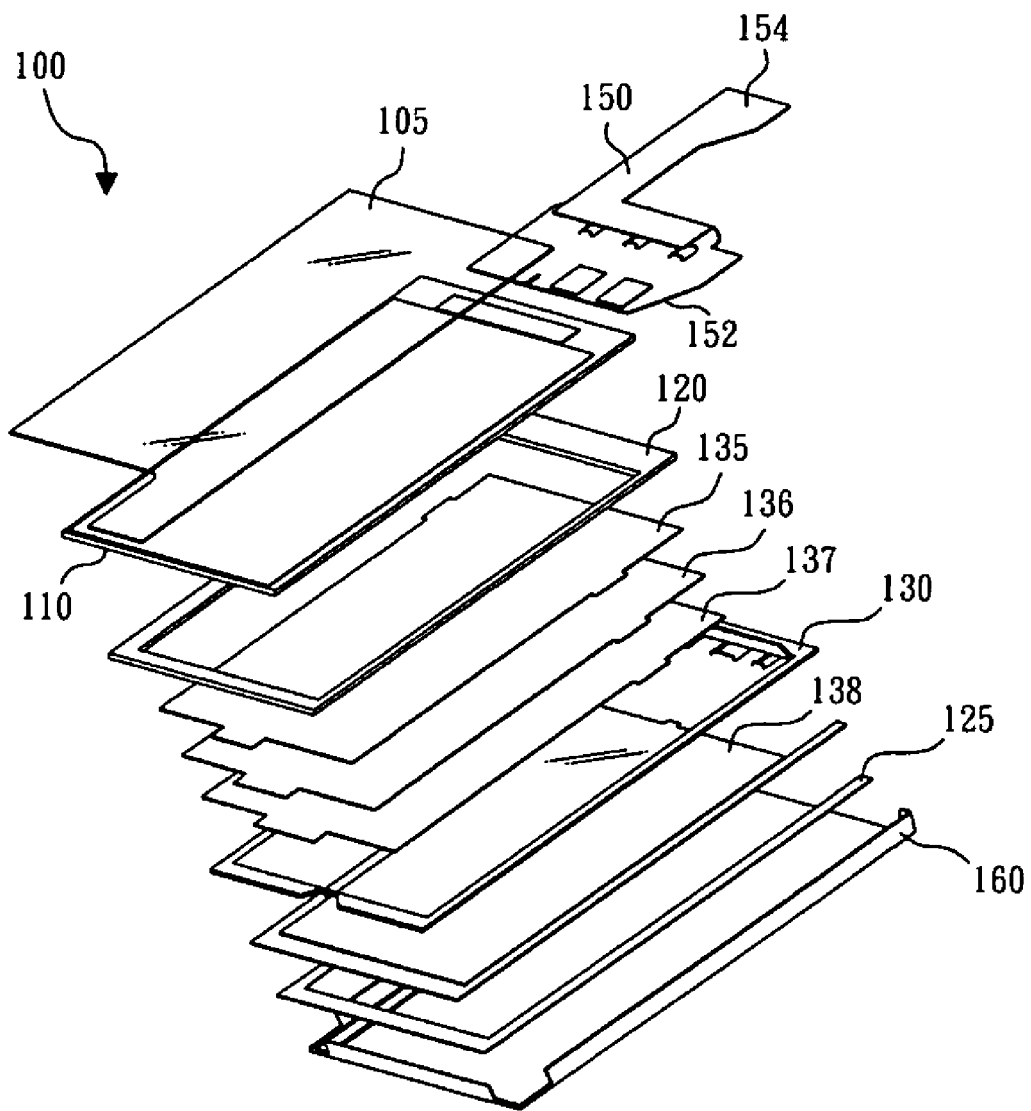
FIG. 2 shows another schematic representation of the display module in accordance with the present invention.

FIG. 2 shows a simplified version of the various components that form the display module 200 in accordance with the invention as described previously in FIG. 1. The LCD panel 210 is provided with a protection sheet 205, which protects the front polarizer from scratches, damages or resistance to chemicals. Further, the protection sheet 205 can be made of a material that provides the display module 200 anti-reflectivity and anti-glare properties. The DSA 220 directly connects the rear substrate of the LCD panel 210 and the lightguide 230. The DSA 220 surrounds the rear polarizer of the LCD panel 210 circumferentially. As described previously, the rear polarizer is smaller than the front polarizer, and covers only the active region of the display module 200. The direct 30 bonding between the rear substrate of the LCD panel 210 and the lightguide 230 makes the adhesive force sufficient to withstand the uplifting forces created by the foil 250. This prevents disintegration of the components of the LCD panel 210. A rear optical stack of components which comprises the rear polarizer, the BEFs 235, 236 and the diffuser film 237 are accommodated within a gap created by the double-sided adhesive foil 220 between the rear substrate of the LCD panel 210 and the lightguide 230. The rear polarizer is bonded to the rear substrate of the LCD panel 210. A second DSA 225 connects the reflector sheet 238 to the outer casing 260.

Although the invention has been elucidated with reference to the embodiments described above, it will be evident that other embodiments may be alternatively used to achieve the same object. The scope of the invention is not limited to the embodiments described above, but can also be applied to display modules in general. It should be noted that the above-mentioned embodiments illustrate rather than limit the invention and that those skilled in the art will be able to design alternative embodiments without departing from the scope of the appended claims. In the claims, any reference signs should not limit the scope of the claim. The invention can be implemented by means of hardware comprising several distinct elements.

It should further be noted that use of the verb "comprises/comprising" and its conjugations in these specifications, including the claims, is understood to specify the presence of stated features, integers, steps, components or groups thereof but does not exclude the presence of further components. It should also be noted that the indefinite article "a" or "an" preceding an element in a claim does not exclude the presence of a plurality of such elements. Moreover, any reference sign does not limit the scope of the claims. Furthermore, the invention resides in each and every novel feature or combination of features.

The invention may be summarized as follows. A display module comprises an LCD panel, which comprises a front substrate and a rear substrate opposed to the front substrate, a liquid crystal material sealed between the front substrate and the rear substrate, a front polarizer associated with the front substrate and a rear polarizer associated with the rear substrate, wherein the components of the LCD panel are bonded together, and the display module further comprises a lightguide having a first surface facing the rear polarizer and a second surface opposed to the first surface, and at least a part of the first surface of the lightguide being bonded directly to the rear substrate of the LCD panel.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display module, comprising:
    an LCD panel, which comprises a front substrate, a rear substrate opposed to the front substrate, a liquid crystal material sealed between the front substrate and rear substrate, and a rear polarizer associated with the rear substrate; and
    a lightguide having a first surface facing the rear polarizer and a second surface opposed to the first surface, wherein at least a part of the first surface of the lightguide is bonded directly to the rear substrate of the LCD panel,
    wherein the bonding between the lightguide and the rear substrate is via a double-sided adhesive foil, and
    wherein the double-sided adhesive foil has a thickness that is greater than a combination of the rear polarizer and a rear optical stack.

2. The display module as claimed in claim 1, wherein the rear substrate has an extended part extending beyond the front substrate, and the lightguide is bonded directly to said extended part of the rear substrate.

3. The display module as claimed in claim 1, wherein the lightguide is bonded directly to the rear substrate of the LCD panel circumferentially around the rear polarizer.

4. The display module as claimed in claim 2, wherein the lightguide is bonded directly to the rear substrate of the LCD panel circumferentially around the rear polarizer.

5. The display module as claimed in claim 1, wherein the double-sided adhesive foil is a laminate of a first foil having a light-reflecting surface facing the lightguide and a second foil having a light-absorbing surface facing the rear substrate.

6. A portable electronic device comprising a display module, wherein the display module comprises:
    an LCD panel, which comprises a front substrate, a rear substrate opposed to the front substrate, a liquid crystal material sealed between the front substrate and rear substrate, and a rear polarizer associated with the rear substrate; and
    a lightguide having a first surface facing the rear polarizer and a second surface opposed to the first surface, wherein at least a part of the first surface of the lightguide is bonded directly to the rear substrate of the LCD panel, wherein the bonding between the lightguide and the rear substrate is via a double-sided adhesive foil, and wherein the double-sided adhesive foil has a thickness that is greater than a combination of the rear polarizer and a rear optical stack.

7. The portable electronic device as claimed in claim 6, wherein the rear substrate has an extended part extending beyond the front substrate, and the lightguide is bonded directly to said extended part of the rear substrate.

8. The portable electronic device as claimed in claim 6, wherein the lightguide is bonded directly to the rear substrate of the LCD panel circumferentially around the rear polarizer.

9. The portable electronic device as claimed in claim 7, wherein the lightguide is bonded directly to the rear substrate of the LCD panel circumferentially around the rear polarizer.

10. The portable electronic device as claimed in claim 6, wherein the double-sided adhesive foil is a laminate of a first foil having a light-reflecting surface facing the lightguide and a second foil having a light-absorbing surface facing the rear substrate.

* * * * *